(12) United States Patent  
Junkersdorf et al.

(10) Patent No.: US 7,646,723 B2  
(45) Date of Patent: Jan. 12, 2010

(54) PROTOCOL TEST DEVICE HAVING AT LEAST TWO CHANNELS

(75) Inventors: Hans-Jürgen Junkersdorf, Berlin (DE); Andreas Kolbe, Berlin (DE); Hans-Ulrich Vollmer, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 1094 days.

(21) Appl. No.: 10/294,340

(22) Filed: Nov. 13, 2002

(65) Prior Publication Data

US 2003/0107997 A1 Jun. 12, 2003

(30) Foreign Application Priority Data

Dec. 11, 2001 (EP) .................................. 01129523

(51) Int. Cl.  
*G01R 31/08* (2006.01)
(52) U.S. Cl. ...................................... 370/247; 370/251
(58) Field of Classification Search ................. 370/241, 370/242, 245, 249, 252, 254  
See application file for complete search history.

(56) References Cited

U.S. PATENT DOCUMENTS 4,598,575 A * 7/1986 Wilke ........................ 73/1.42

| 5,375,159 | A |  | 12/1994 | Williams |
|---|---|---|---|---|
| 5,974,363 | A |  | 10/1999 | Gammel |
| 6,816,462 | B1 | * | 11/2004 | Booth et al. ................. 370/248 |
| 2002/0091977 | A1 | * | 7/2002 | Mastro et al. ................ 714/712 |

OTHER PUBLICATIONS

Rohde & Schwarz, GSM Protocol Analyzer CRTU-G, pp. 4-8, 2001.*  
Tektronix, "K1103 Protocol Tester", Product Catalog, Jan. 1999.  
Agilent Technologies, "ATM Traffic Management Test Solution", May 2001.

* cited by examiner

*Primary Examiner*—Frank Duong  
(74) *Attorney, Agent, or Firm*—Francis I. Gray; Michael A. Nelson; Matthew D. Rabdau

(57) ABSTRACT

A protocol test device has at least two channels which each have a transmit and a receive side, the protocol test device being designed to switch a signal transmitted from a first channel to the receive side of a second channel. A method for determining, by approximation, a transmit time of a data package in the protocol test device includes the following steps: a) transmitting a signal via the transmit side of the first channel, b) forwarding the signal to the receive side of the second channel, and, c) in the receive side of the second channel allocating a time stamp to the signal.

9 Claims, 3 Drawing Sheets

PROTOCOL TEST DEVICE HAVING AT LEAST TWO CHANNELS

BACKGROUND OF THE INVENTION

The present invention relates to a protocol test device having at least two channels which each have a transmit side as well as a receive side, and more particularly to a method for determining, by approximation, a transmit time of a data package from the protocol test device.

The problem on which the present invention is based is to be explained using the example of an arrangement known from the prior art which is illustrated in FIG. 1. FIG. 1 is a schematic view of the structures of first and second protocol test device channels. Channel 1 and channel 2 are identically structured, each exhibiting a transmit side and a receive side. For testing a test object 10 (shown in dashed lines), a message is first of all generated in a block 12 on the transmit side. In a block 14, this message is then time-stamped and subsequently written into a storage 16, usually of the FIFO type. Depending on the occupancy of FIFO 16, the message to be transmitted is forwarded to the test object 10 at an earlier or later time, with an output signal of the test object 10 being forwarded to the receive side of channel 1. There it first passes a storage 18 on the receive side which is likewise preferably of the FIFO type. Subsequently, the message is time-stamped in block 20 and is finally evaluated in block 22.

Using a switch $S_{tst1}$, the transmit signal from the transmit side of a particular channel can be guided directly to the receive side of the same channel, thus avoiding the test object 10, in order to check the quality of the transmit signal or the receiving characteristics of this channel of the protocol test device.

Channel 2 is of identical structure, with the respective components being additionally marked "a". In channel 2, switch $S_{tst2}$ corresponds to switch $S_{tst1}$.

Two monitoring switches $S_{mon1}$, $S_{mon2}$ allow a switching to pure monitoring operation of a two-channel line between two network subscribers in the position shown in dashed lines. In the position drawn as a solid line, the two network subscribers can be triggered by transmit signals from the protocol test device.

For protocol test devices simulating or emulating communication protocols the transmit time must be determined as precisely as possible. As shown in FIG. 1, the time stamp is assigned before the message to be transmitted is written into FIFO 16. However, the occupancy of FIFO 16 is usually unknown for which reason it cannot be determined precisely when the message is actually transmitted, i.e. when the message actually leaves the transmit side and thus storage 16.

What is desired is to provide a protocol test device of the aforementioned kind which allows a more precise determination of the transmit time of a message, and to provide a method for determining, by approximation, the transmit time of a data package from the protocol test device.

BRIEF SUMMARY OF THE INVENTION

The present invention is based on the idea that in particular during monitoring operation, storages on a receive side of channels in a protocol test device are almost always empty or have essentially the same occupancy, i.e. a time stamp allocated by a time stamp unit on the receive side roughly corresponds to the actual reception time of a transmitted message. On the basis of this idea, for determining transmit time, a transmit signal from a first channel is on the one hand returned directly to the receive side of a second channel of the protocol test device, and on the other hand is forwarded to a test object, with an output signal of the test object being received via the receive side of the first channel of the protocol test device.

Especially when messages are sent to and fro between two networks, the two receive storages of the protocol test device are filled to an almost identical extent. Consequently, any time stamps allocated by the time stamp units of the respective receive sides exhibit similar errors and can thus be compared with each other. This results in a substantially lower measuring inaccuracy than with the method known in the prior art in which the waiting time in a transmit side storage is equated with the waiting time in a receive side storage.

The measure taken according to the invention does not result in the application of the protocol test device becoming more complex. A simulation or emulation can be evaluated just as in a monitoring application, i.e. a user links the test object to a port, as usual, i.e. to the two lines of a channel of the protocol test device according to the invention.

The measure according to the invention furthermore has the advantage that it allows a logical separation of transmit and receive signals. For checking the message transmitted, such message does not have to be redirected but can now also be directed to an adjacent channel instead.

Preferably, the measure according to the invention can be accomplished by providing a switch in the receive side of the first channel, which switch can be used for switching between receiving a signal applied to the associated receive port of the protocol test device and receiving the transmit signal from the transmit side of the second channel of the protocol test device.

Particularly precise times can be determined if the data reception in the protocol test device is controlled such that the receive signal storage(s) are kept as empty as possible.

In a preferred embodiment of the protocol test device of the invention, the transmit signal storages and/or the receive signal storages are in the form of a FIFO.

Further advantageous embodiments of the invention are set out in the subclaims.

BRIEF DESCRIPTION OF THE SEVERAL VIEWS OF THE DRAWING

In the following, an embodiment of the invention is explained with reference to the accompanying drawings, of which

Note that throughout the drawings, identical reference numerals have been used to designate identical elements and elements of identical effect or function.

DETAILED DESCRIPTION OF THE INVENTION

Figure 1:
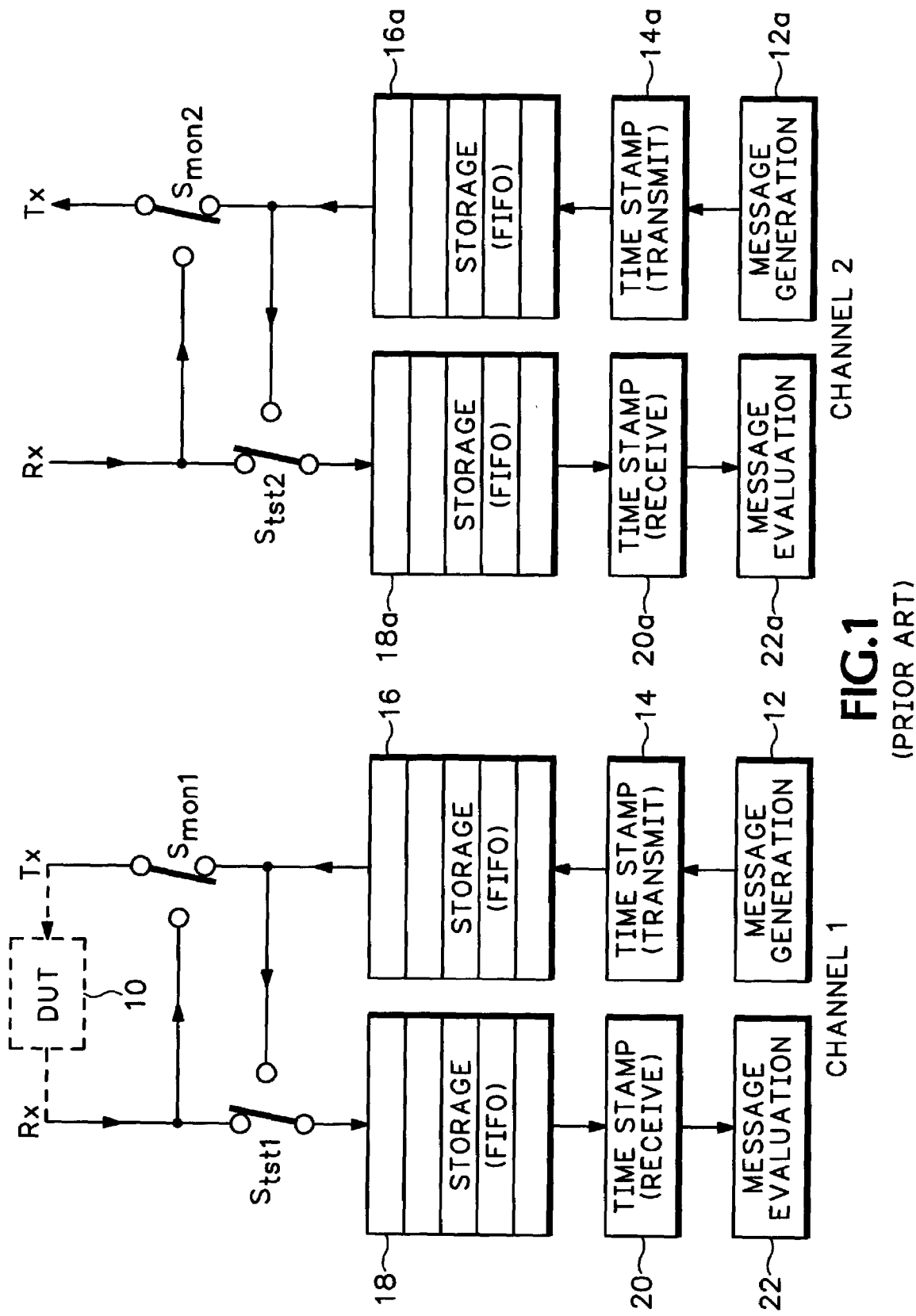
FIG. 1 is a principal circuit diagram of a prior art protocol test device with two channels which each include a transmit and a receive side
Figure 2:
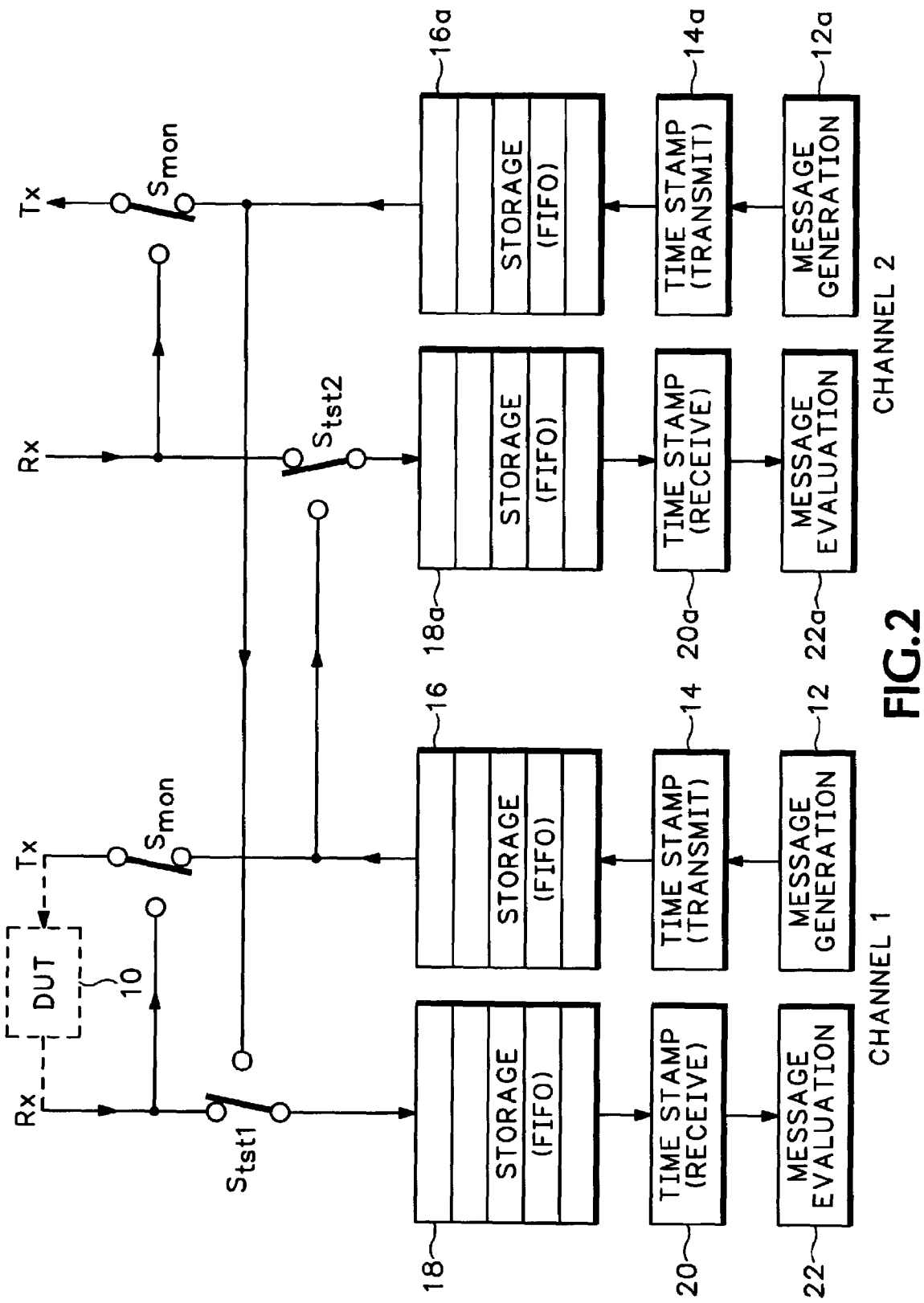
FIG. 2 is a principal circuit diagram of a protocol test device according to the invention, with the positions of switches having been chosen so as to obtain the configuration shown in FIG. 1.

With reference to FIG. 2, a switch $S_{tst1}$, can be used according to the invention to forward a signal arriving at an Rx port of channel 1 to a receive side of channel 1, on the one hand, and, on the other hand, to forward thereto a signal transmitted by channel 2. Vice versa, a switch $S_{tst2}$ can be used to forward a signal arriving at an Rx port of channel 2 to a receive side of channel 2, or also a signal transmitted by channel 1. In the illustrated position of the switches $S_{tst1}$ and $S_{tst2}$ the arrangement shown in FIG. 2 corresponds in function to that of FIG. 1.

Figure 3:
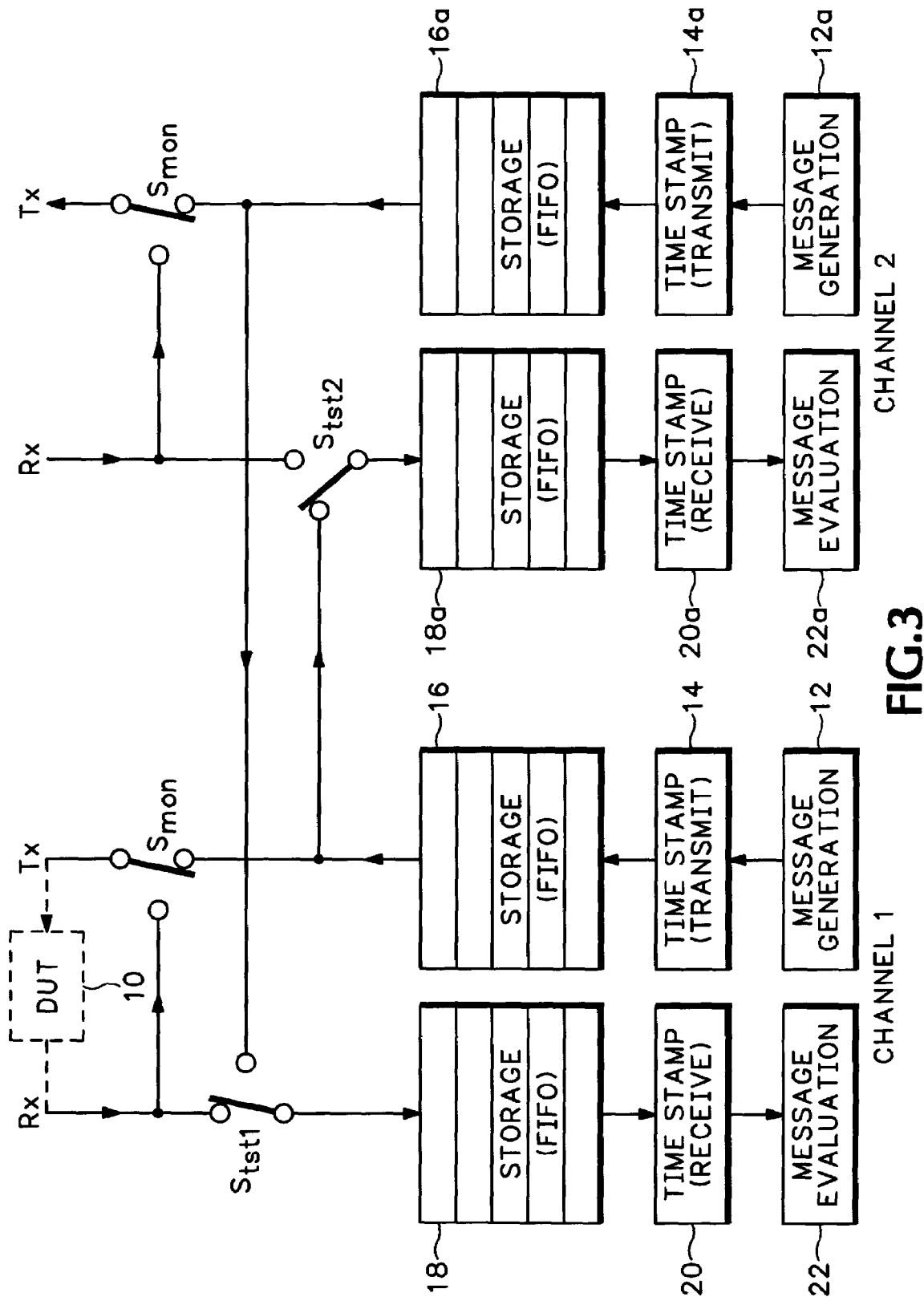
FIG. 3 is a view of the embodiment of FIG. 2 of the protocol test device according to the invention wherein the switches have been chosen such that a transmit signal from channel 1 is received by the receive side of channel 2.

FIG. 3 in turn shows the arrangement of FIG. 2, in which the switch $S_{tst2}$ now is in a position in which the signal from channel 1 is forwarded to the receive side of channel 2. The time determined by the time stamp unit 20a of the receive side of channel 2 is assumed to be the transmit time for the message transmitted by the transmit side of channel 1. The receive time of this message is determined in the usual way by the time stamp unit 20 on the receive side of channel 2. Since the two receive side storages 18, 18a essentially have the same occupancy, the times determined by the associated time stamp units 20, 20a are substantially comparable.

What is claimed is:

1. A protocol test device comprising:
   at least two channels, with each channel including a transmit side and a receive side;
   a signal transmitted from the transmit side of a first channel being forwarded to the receive side of a second channel; and
   in a receive path of the receive side of the second channel, the received signal first passes a receive signal storage and subsequently a receive signal time stamp unit.

2. The protocol test device as claimed in claim 1 wherein in a transmit path of the transmit side of the first channel, the signal to be transmitted first passes a transmit time stamp unit and subsequently a transmit signal storage.

3. The protocol test device as claimed in claim 2 wherein in the receive side of the second channel, a switch is provided which is used for switching between reception of a signal applied to an associated receive port and reception of the signal from the transmit side of the first channel.

4. The protocol test device as claimed in claim 2 wherein data reception in the protocol test device is controlled such that the receive signal storage is kept as empty as possible.

5. The protocol test device as claimed in claim 2 wherein the transmit signal storage is provided as a FIFO.

6. The protocol test device as claimed in claim 2 wherein the receive signal storage is provided as a FIFO.

7. A method for determining, by approximation, a transmit time for a data package in a protocol test device, the protocol test device including at least two channels which each have a transmit side and a receive side with an associated receive signal time stamp unit, comprising the following steps:
   a) transmitting a signal via the transmit side of a first channel;
   b) forwarding the signal to the receive side of a second channel;
   c) in the receive side of the second channel allocating a time stamp to the signal via the associated receive signal time stamp unit.

8. The method as claimed in claim 7 wherein, in step b), the signal transmitted from the first channel is also forwarded to a test object (10) and, in step c), an output signal of the test object (10) is received via the receive side of the first channel and is allocated a time stamp via the associated receive signal time stamp unit.

9. The method as claimed in claim 7 or 8 wherein the signal, before being allocated a time stamp, passes a receive signal storage associated with the receive side.

\* \* \* \* \*